United States Patent [19]
Young

[11] 3,878,506
[45] Apr. 15, 1975

[54] AIRPORT LIGHTING AND RADAR REFLECTOR COMBINATION

[76] Inventor: David W. Young, 627 N. Beachwood Dr., Hollywood, Calif. 91506

[22] Filed: Aug. 20, 1973

[21] Appl. No.: 389,787

Related U.S. Application Data

[63] Continuation-in-part of Ser. No. 385,534, Aug. 3, 1973.

[52] U.S. Cl. ............ 340/27 NA; 343/721; 343/909; 240/1.2
[51] Int. Cl. ........................ H01q 1/06; G08g 5/00
[58] Field of Search ........ 343/18 R, 18 C, 721, 912; 340/27 NA, 25, 26; 350/101, 162 R, 163, 164, 166; 240/1.2

[56] References Cited
UNITED STATES PATENTS

| | | |
|---|---|---|
| 2,099,671 | 11/1937 | Bairey .................................. 343/721 |
| 2,423,648 | 7/1947 | Hansell .............................. 343/840 |
| 2,502,974 | 4/1950 | McElhannon ..................... 343/18 R |
| 2,619,303 | 11/1952 | Martin ............................. 343/915 A |
| 3,620,626 | 11/1971 | Daly ...................................... 340/25 |
| 3,671,963 | 6/1972 | Assouline et al .............. 340/27 NA |
| 3,721,983 | 3/1973 | Sherer ................................ 343/18 B |

*Primary Examiner*—Eli Lieberman
*Attorney, Agent, or Firm*—Pastoriza & Kelly

[57] ABSTRACT

One or more airport lights such as a runway light, green/white rotating aerodrome beacon, taxi light, threshold light, etc., is integrated with a radar reflector to enhance the echo signal from radar radiation. Airport detection and recognition on a radar screen in an aircraft as well as increased aids to approach and landing are provided by the more prominent echo signals.

4 Claims, 5 Drawing Figures

AIRPORT LIGHTING AND RADAR REFLECTOR COMBINATION

This application is a continuation in part of my copending patent application Ser. No. 385,534 filed Aug. 3, 1973 and entitled PERSPECTIVE RADAR AIRPORT RECOGNITION AND LANDING GUIDANCE SYSTEM.

This invention relates generally to radar and more particularly to light structures integrally including radar reflectors for use at airports to thereby enhance radar echo signals on the display screen of a high resolution radar in an aircraft and thus aid in airport detection, recognition, approach and landing of the aircraft.

BACKGROUND OF THE INVENTION

In my above referred to parent application, there is mentioned the use of a rotating beacon light/radar reflector as a unique pulsating radar target to which an approaching aircraft may "lock on" in effecting a radar approach and landing. In my more recent co-pending application Ser. No. 385,087 filed Aug. 2, 1973 and entitled RUNWAY APPROACH RADAR REFLECTORS, there are disclosed specially designed radar reflector strips which will provide specific echo signals on the display screen of a wholly self-contained radar on an aircraft indicating to the pilot his azimuth bearing and elevation at the approach end of the airport runway. A detailed outline of the entire runway however is seldom clearly defined on the radar display thus limiting to some extent the usefulness of the foregoing system.

Most airports in the country include airport lighting in the form of runway lights, rotating beacons and the like. In most instances, the lighting structures include some metal and glass in the light and support structure which provides marginal radar reflection for high resolution radars on approaching aircraft. If radar echo signals from such lights could be enhanced, a radar picture outline of the runway could be provided on the display screen in the aircraft in poor weather thereby aiding the pilot in the same manner as do lights in a clear weather night landing.

BRIEF DESCRIPTION OF THE PRESENT INVENTION

With the foregoing in mind, the present invention contemplates integrating with airport light structures such as runway lights, beacon lights, taxi lights and so forth a radar reflector means which will substantially enhance echo signals from the light all to the end that the pilot of an aircraft provided with high resolution radar can readily detect from great distances the airport by the rotating beacon and can discern the runway and taxi light pattern and thus be substantially aided in recognizing the airport and approaching and effecting a proper landing. Furthermore, the light/radar reflector combination will provide guidance on roll out and taxi at large airports where the requirement to operate at poorer visibility is ever present.

The enhancement of reflection from lighting structures is particularly useful in the case of runway lights which generally line each side of the runway. Not only is recognition, guidance and landing greatly facilitated in bad weather but even in good weather at night time in the event of an airport blackout, ability to recognize the position of light structures, particularly the runway lights would be extremely useful to a pilot.

In accord with the invention, a radar reflector is integrated with a guidance light structure at an airport, such as the runway light or the beacon and is designed to enhance substantially echo signals from radar radiation impinging on the light structure.

In the case of a rotating beacon light, the improved radar reflector is an integral part of the light rotating with the light so that the return echo signal pulsates in intensity on the radar screen in much the same manner as the familiar green-white light pulsates to a direct observer.

Preferably, a glass plate which serves as the light lens or glass cover through which light is transmitted is so designed as to constitute an essentially ideal radar reflector.

DETAILED DESCRIPTION OF THE INVENTION

A better understanding of the present invention will be had by referring to various embodiments thereof as illustrated in the accompanying drawings in which.

DETAILED DESCRIPTION OF THE INVENTION

Figure 1:
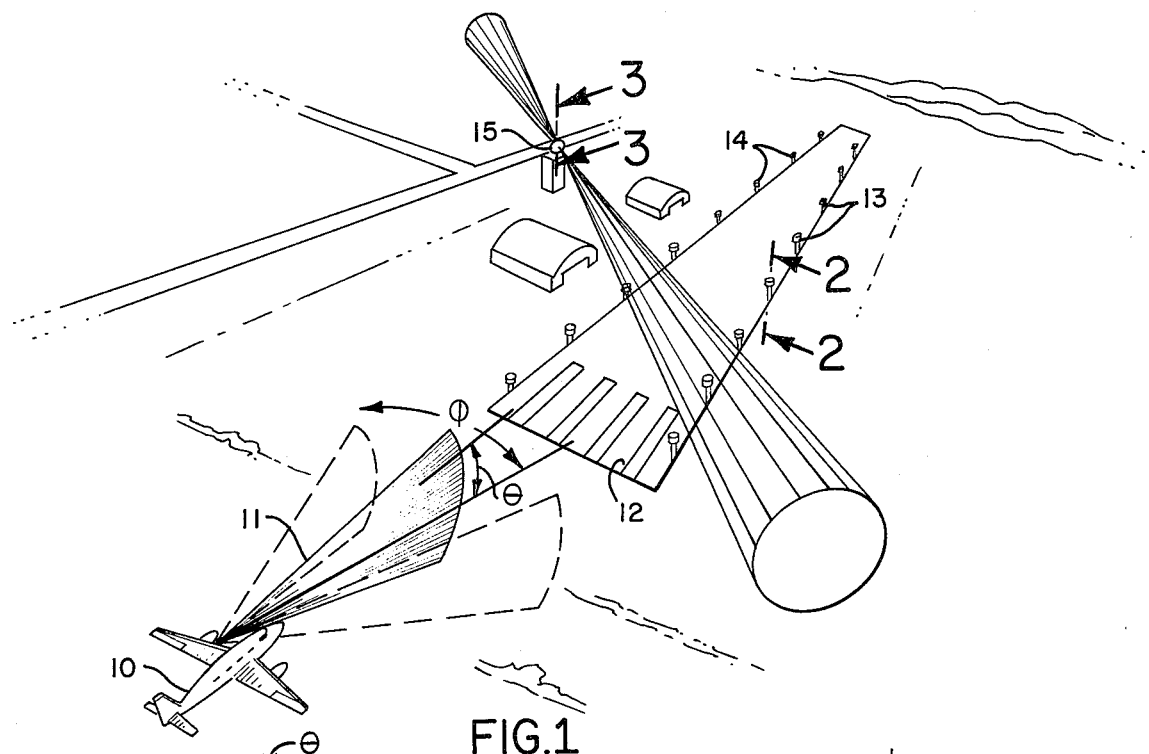
FIG. 1 is a perspective view of an airport complex showing an aircraft equipped with a high resolution radar approaching the runway for a landing.

Referring first to FIG. 1 there is shown an aircraft 10 equipped with high resolution radar which may take the form of a perspective radar generating a fan-shaped beam in a vertical plane as indicated at 11. The beam 11 is arranged to sweep through an azimuth angle $\phi$. As shown, the aircraft is approaching the airport runway shown at 12 along a glide path angle of $\theta$.

Normally, the runway 12 itself will be lined along each side with runway lights such as indicated at 13 and 14. Also shown in the complex is a rotating aerodrome beacon light 15.

In accord with the basic concept of the present invention, the runway lights and/or the beacon light 15, or any other selected light structures, hereinafter referred to as a guidance light, incorporates a radar reflector to enhance echo signals from radar radiation impinging on the light structures such as generated by the fan-shaped radar beam 11.

The enhanced return echo signals will be clearly visible on the pilot's radar screen and will aid him greatly in airport detection, recognition, approach, landing, roll out, taxing, and so forth.

Figure 2:
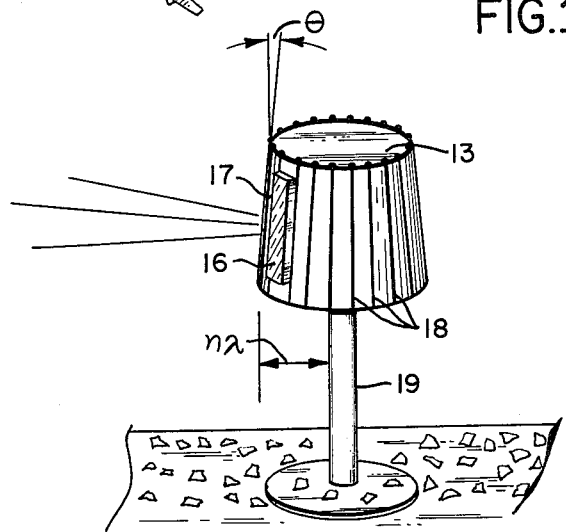
FIG. 2 is a fragmentary cross section of a portion of the runway showing a typical runway light in full lines taken in the direction of the arrows 2—2 of FIG. 1.

Referring now to FIG. 2 there is illustrated one of the runway lights 13 wherein such a radar reflector has been incorporated. In the embodiment of FIG. 2, this radar reflector takes the form of a glass lens or light cover 16 which may be substituted for the conventional glass cover in the light structure. The particular glass 16 by way of example may comprise soda-potash-lead silicate having a dielectric thickness of one-fourth of a wave length in the dielectric of the frequency of the radar radiation to be reflected. This thickness would be about one-eighth of an inch at X-band. This however is transparent to light. By utilizing such a special glass, more than 50 percent radar echo return can be realized from the glass alone. By adding a conductive grid in the form of thin vertical strips spaced less than ½ wave length apart, for example about 0.3 inches at X-band, as shown at 17, and by also providing such strips on the cylindrical light enclosure as shown at 18, radar reflection is increased to close to 100 percent.

In accord with a further feature, the plane of the glass cover may be tilted slightly with respect to the vertical as indicated by the angle $\theta$, which angle would correspond to the normal aircraft glide path. The cylindrical light enclosure would thus be slightly conical. Furthermore, the staff 19 for the cylindrical enclosure would be dimensioned relative to the diameter of the enclosure to assure that radar reflections from the staff would be in phase with reflections from the cylindrical enclosure. The radius of the staff 19 should thus be one or an integral number of wave lengths different from the radius of the enclosure 13. Typically for X-band, the radius of the enclosure 13 would be 3 inches and the radius of the staff 19 about ½ inch. The height of the enclosure itself would be about six inches.

Essentially, the special glass cover and enclosure is equivalent to a conductive cylinder of a given diameter. For such a structure, the scattering cross section is fairly large. The reflected radar beam width would be about 6° and when the glass is tilted at the glide slope, a greatly enhanced reflection will result. Further, because of the three degree reflected beam angle and the 6° beam width, the reflector would be very useful even on a 6° glide slope approach.

Figure 3:
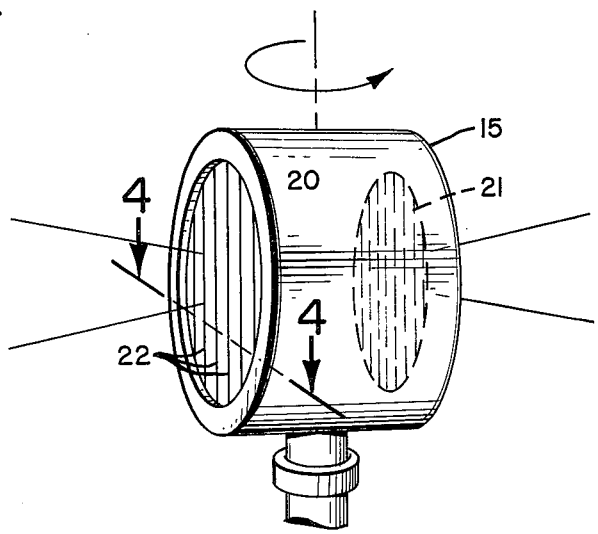
FIG. 3 is a fragmentary perspective view of a rotating beacon light in the airport complex of FIG. 1 taken in the direction of the arrows 3—3.

Referring now to FIG. 3, there is shown the rotating beacon 15 which is essentially a two sided light having two opposite glass lens 20 and 21, one for transmitting green light and the other white light. Such a beacon light is normally rotated at a constant slow rate; for example, one rotation every 3 seconds. When an aircraft is making a non-precision night approach the beacon is very useful as an aid in detecting the airport location, particularly when the airport is at such a distance that the runway details cannot be identified. While the light turns at a slow rate, the beam is quite narrow and appears as a short period, pulsing light which is alternately green and white.

Such a light would seldom be seen at any appreciable distance if it were not for the fact that the rotation of the narrow light beam gives a flashing effect. Without the flashing or pulsing effect, the light would be lost in the clutter of many other lights. It is this pulsing property that can be gainfully adapted to radar if and only if the radar is a rapid scanning, high resolution, radar.

Referring once again to FIG. 1, in the example choosen, the fan-shaped beam 11 is generated by a high resolution rapid scanning radar such as a perspective radar system as described in my co-pending applications identified as follows:

Serial number 487,121 filed Aug. 4, 1969 for AIRCRAFT CONTAINED PERSPECTIVE RADAR/DISPLAY AND GUIDANCE FOR APPROACH AND LANDING, now U.S. Pat. No. 3,778,821 issued Dec. 11, 1973 and Ser. No. 353,201 filed Apr. 20, 1973 for RIDGE SCAN ANTENNA.

The radar system described in the above applications scans at about 40 sweeps per second and may operate in the X-band, the azimuth beam width of the vertical fan-shaped radar beam being about 0.7°. Assuming the beacon light rotates once every 3 seconds and the light radiation itself has a beam width of 3° and the reflected radar beam width is 3°, the period of time that the beam is visible would be 3/360 times 3 seconds or 0.025 seconds. Thus, the radar antenna would need at least a 36 scans per second to catch such a beam each time the beacon rotates.

It thus becomes feasible, provided that the aircraft incorporates a high resolution rapid scan radar, to combine a radar reflector with the rotating beacon. The effect would be a pulsating radar echo target signal on the display screen in the aircraft cockpit which could be very readily identified in the same manner that a flashing or pulsating light can be identified among a clutter of lights.

Referring again to FIG. 3 in accord with the invention, the glass covers 20 nd 21 may incorporate radar reflector means by providing the special type of glass described in conjunction with FIG. 2 or, alternately, or in combination with the glass, a series of thin parallel vertical conductors 22 secured to and extending vertically along the glass cover.

Figure 4:
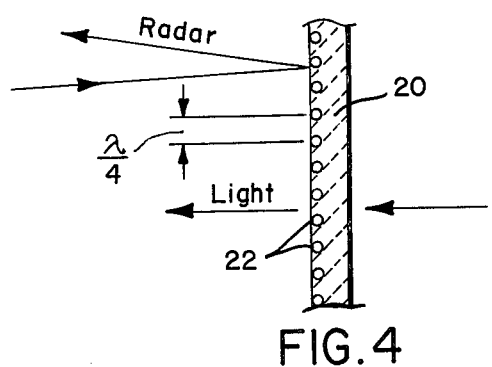
FIG. 4 is a fragmentary cross section of the glass lens of the beacon light of FIG. 3 taken in the direction of the arrows 4—4.

Referring specifically to the enlarged fragmentary cross section of FIG. 4, the conductors 22 would be spaced of the order of one-fourth the wave length of the frequency of the radar radiation. In the case of X-band, the spacing would be about 0.3 inches. By making the wires a very small diameter; for example, 10 mils there would be no appreciable interference with light transmission through the lens 17. On the other hand the array of conducting wires would function as an excellent reflector for radar frequencies in the X-band range.

The beacon combination light and radar would have an equivalent flat conductive plate area of about 2 feet by 2 feet which would give a reflected beam width (two way beam width) of about 1.5°. The flat plate would be tilted up to coincide with an approximate 3° glide slope and the 2 foot reflector would still be useful on a 6° approach.

The scattering cross section for a flat plate of area A is very large and when the combination light and radar reflector is mounted on an obstacle such as a tower that also gives a radar return, the return will be increased greatly when the beacon turns to the right position.

Figure 5:
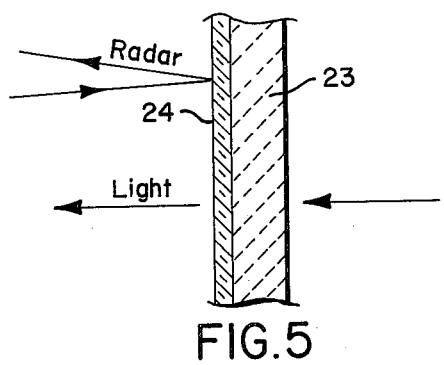
FIG. 5 is a view similar to FIG. 4 showing a modified glass lens provided with means for enhancing radar reflection.

Any other suitable means for providing good radar reflections and yet also assure proper light transmission can be incorporated in the glass cover. For example, in FIG. 5, there is shown for a glass lens or plate 23 a filter coating 24 which may be designed to have a high pass band for light frequency and a rejection characteristic for the substantially lower radar frequencies. Thus, the filter 24 would simply reflect frequencies on the order of 10,000 megacycles as indicated by the arrows for the radar radiation and yet transmit the higher light frequencies.

From the foregoing description it will thus be evident that by integrating radar reflector means with conventional airport light structures such as runway taxi, and/or beacon lights detection, recognition and subsequent approach and landing is greatly facilitated. Not only is there provided on the radar display signals which provide for an early identification of the airport during approach, but in the event of an airport blackout due to power failure at night, the radar could still be used to "see" the airport.

Further where the runway lights are employed, emergency landings could still be made even if the runway lights were not turned on. Moreover, early orientation and runway alignment on approach would be readily effected particularly when a high resolution perspective radar is employed, the runway lights themselves outlining the runway on the radar screen as a series of sharp clear echo signals defining the sides of the runway.

Finally, and as mentioned heretofore, the integration of the radar reflector in a rotating beacon provides for a pulsating radar echo on high resolution rapid scan radar screen which target can be very easily selected among all of the other signals displayed on the screen.

It should be understood that the description of the runway light of FIG. 2 is equally applicable to taxi lights and runway threshold lights. Moreover, lights imbedded in a runway or taxi strip may be provided with substitute glass covers providing the enhanced radar reflector thereby providing with the taxi lights excellent guidance during roll out and taxing on the ground.

What is claimed is:

1. In combination:
   a. an airport guidance light structure permanently attached at an airport facility and including a light transparent glass cover through which light is directionally transmitted in the form of a beam; and
   b. A radar reflector integrally formed with said cover comprising a high pass filter for transmitting visisble light frequencies and reflecting lower frequencies including the frequency of radar reflection, said high pass filter comprising a series of thin parallel conductors secured to and extending along the glass, said conductors being spaced apart on the order of one fourth of a wave length of the frequency of the radar radiation to be reflected to thereby enhance echo signals from radar radiation impinging on the light structure whereby the pilot of an aircraft equipped with a high resolution radar can readily detect the presence of the guidance light structure on his radar screen.

2. In combinations:
   a. an airport guidance light structure permanently attached at an airport facility and including a light transparent glass cover through which light is directionally transmitted in the form of a beam; and
   b. a radar reflector integrally formed with said cover comprising a high pass filter for transmitting visible light frequencies and reflecting lower frequencies including the frequency of radar radiation, said glass cover being comprised of soda-potash-lead silicate having a dielectric thickness of one fourth of a wave length in the dielectric of the frequency of the radar radiation to be reflected to thereby provide said high pass filter and enhance echo signals from radar radiation impinging on the light structure whereby the pilot of an aircraft equipped with a high resolution radar can readily detect the presence of the guidance light structure on his radar screen.

3. In combination:
   b. a plurality of runway light structures running along the sides of a runway permanently attached at an airport facility and each including a light transparent glass cover through which light is directionally transmitted in the form of a beam; and
   b. a radar reflector integrally formed with said cover comprising a high pass filter for transmitting visible light frequencies and reflecting lower frequencies including the frequency of radar radiation, the plane of each cover being tilted at an angle to the vertical corresponding to the normal glide slope angle of an approaching aircraft to thereby enhance echo signals from radar radiation impinging on the runway light structures whereby the pilot of an aircraft equipped with a high resolution radar can readily detect the presence of the runway light structures on his radar screen.

4. The combination of claim 1, in which the guidance light structure constitutes a rotating beacon light, the radar reflector rotating with the light so that the return echo signal pulsates in intensity on the radar screen.

* * * * *